US006892160B2

(12) United States Patent
Gooch et al.

(10) Patent No.: US 6,892,160 B2
(45) Date of Patent: May 10, 2005

(54) ASSEMBLY METHOD (75) Inventors: Richard Michael Gooch, Surrey (GB); Carol Anne Walker, Bristol (GB); John Stewart Anderson, Bristol (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 10/089,891

(22) PCT Filed: Apr. 6, 2001

(86) PCT No.: PCT/GB01/01581

§ 371 (c)(1),
(2), (4) Date: Mar. 19, 2003

(87) PCT Pub. No.: WO01/76943

PCT Pub. Date: Oct. 18, 2001

(65) Prior Publication Data

US 2003/0167147 A1 Sep. 4, 2003

(30) Foreign Application Priority Data

Apr. 6, 2000 (GB) .............................................. 0008302

(51) Int. Cl.$^7$ .............................................. G01C 17/00
(52) U.S. Cl. ...................... 702/150; 356/614; 356/622; 700/159; 700/186; 700/192; 700/95; 700/114; 244/177 R
(58) Field of Search ........................... 700/96, 117, 159, 700/186, 192, 95, 114; 244/119, 123, 117 R; 702/152, 153, 155, 158, 167, 150; 356/614, 322

(56) References Cited

U.S. PATENT DOCUMENTS

| | | | |
|---|---|---|---|
| 4,651,283 A | * 3/1987 | Sciaky et al. | 700/207 |
| 4,851,905 A | 7/1989 | Pryor | 348/169 |
| 4,973,817 A | * 11/1990 | Kanno et al. | 219/121.63 |
| 5,010,634 A | 4/1991 | Uemura et al. | 29/407.05 |
| 5,064,991 A | * 11/1991 | Alborante | 219/121.63 |

(Continued)

FOREIGN PATENT DOCUMENTS

| | | |
|---|---|---|
| EP | 0 593 127 A1 | 10/1993 |
| EP | 0 957 335 A2 | 5/1999 |
| GB | 2 276 600 A | 10/1994 |
| JP | 20006897 A | 1/2000 |
| WO | WO 91/06826 | 5/1991 |
| WO | WO 97/34733 | 9/1997 |

OTHER PUBLICATIONS

NICJAC Precision Positioners, Apr. 15, 1994, Nicholson Machine and Technology Group (5 pages).

Air World, vol. 21, No. 1 (1997) and a partial English translation (4 total pages).

"Laser–referenced aircraft assembly" *Aerospace Engineering*, May 1997, pp. 47–48.

Hughes, D. "New Tooling Scheme Used for CL–415" *Aviation Week & Space Technology* (1993) pp. 46–47.

Kyle, S. et al. "Automated part positioning with the laser tracker" Fifth International Workshop on Accelerator Alignment ANL/FNAL Oct. 13–17, 1997 (18 total pages).

*Primary Examiner*—John Barlow
*Assistant Examiner*—Anthony T. Dougherty
(74) *Attorney, Agent, or Firm*—Crowell & Moring LLP (57) ABSTRACT

A method of locating an assembly point (P) on a first part (40), at which assembly point the first part is to be joined to a second part (1), the method comprising the steps of: determining an assembly location (1a, 1b, 1c, 1d) in respect of the second part; measuring a portion (42a, 42b, 42c) of a surface (43) of the first part, the surface being spaced away from the second part, so as to define the position and orientation of the surface; and, calculating the assembly point on the surface of the first part, where the surface of the first part is intersected by a vector (N) passing between the determined assembly location and the surface of the first part.

13 Claims, 4 Drawing Sheets

U.S. PATENT DOCUMENTS

| | | | | |
|---|---|---|---|---|
| 5,115,115 A | * | 5/1992 | Alborante | 219/121.63 |
| 5,142,118 A | * | 8/1992 | Schlatter | 219/121.63 |
| 5,148,591 A | | 9/1992 | Pryor | 29/407.04 |
| 5,168,453 A | | 12/1992 | Nomaru et al. | 364/468 |
| 5,312,211 A | | 5/1994 | Rodriguez | 409/79 |
| 5,380,978 A | | 1/1995 | Pryor | 219/121.64 |
| 5,427,300 A | * | 6/1995 | Quagline | 228/4.1 |
| 5,530,549 A | | 6/1996 | Brown | 356/376 |
| 5,646,859 A | | 7/1997 | Petta et al. | 700/95 |
| 5,696,673 A | | 12/1997 | Pryor | 364/167.01 |
| 5,861,956 A | | 1/1999 | Bridges et al. | 356/375 |
| 5,910,894 A | | 6/1999 | Pryor | 700/95 |
| 6,003,812 A | | 12/1999 | Micale et al. | 244/117 R |
| 6,230,382 B1 | | 5/2001 | Cunningham et al. | 29/407.1 |
| 6,510,357 B1 | * | 1/2003 | Naik et al. | 700/98 |

* cited by examiner

ASSEMBLY METHOD

BACKGROUND OF THE INVENTION

The present invention relates to a method of locating assembly points in an assembly process, particularly but not exclusively, a method of marking out drilling locations in an industrial assembly process, such as aircraft assembly.

In conventional large scale assembly processes such as are employed in the aircraft industry, or dockyards, there is a frequent requirement to fix parts to large structures.

In the case of aircraft assembly, for example, a wing box for a wing of a large passenger liner may be up to 30 meters in length. Because of the great size of the structure, measuring a position on the structure to a high degree of accuracy is difficult to achieve. When a wing skin is to be fixed to such a wing box, and the two are clamped together prior to fixing, it is essential to determine accurately from the wing skin side of the structure where to drill attachment holes through the wing skin and into the supporting feet of a rib of the wing box.

This process is conventionally achieved in several separate operations. Firstly, guide holes of a smaller than final diameter may be drilled in the rib feet in the desired locations, prior to offering up the wing skin. Secondly, with the wing skin in place, pilot holes are drilled from inside the wing box outwards through the wing skin, in a process known as "back drilling". Thirdly, using the pilot holes, the position of the predrilled guide holes in the rib feet are estimated. Finally, drilling of assembly holes from the outside of the wing skin through the wing skin and into the supporting rib feet may be commenced.

However, if the orientation of a guide hole, with respect to the local wing skin surface, is estimated insufficiently accurately, the assembly hole may not fully circumscribe the guide hole drilled in the rib foot. This results in a "pipped" hole. Consequently, it may be necessary to re-drill the hole using an oversized drill bit, in order to rectify the "pipped" hole. However, where the structure being assembled is a stressed structure, the effect of oversized drilling may give rise to a reduced service life of the structure.

SUMMARY OF THE INVENTION

Therefore, there is a need for a method of accurately marking out assembly locations, which overcomes one or more of the disadvantages of the prior art system.

According to a first aspect, the invention resides in a method of locating an assembly point on a first part, through which the first part is to be joined to a second part, the method comprising the steps of: determining an assembly location in respect of the second part; measuring a portion of a surface of the first part spaced away from the second part so as to define the position and orientation of the surface; calculating the assembly point on the surface of the first part, where the surface of the first part is intersected by a vector passing between the determined assembly location and the surface of the first part; and, indicating the calculated the assembly point on the surface of the first part.

Advantageously, the present invention gives rise to an effective method of accurately identifying the correct point through which a first part is to be fixed to, or assembled with a further part. Using a method of the invention, an assembly hole, for example, may be drilled at the correct location and angle on the surface of the first part so that the assembly hole passes accurately through a chosen assembly point of the further part at the desired angle. Thus, the method of the present invention reduces the possibility of inaccurate drilling, or other fixing process, which might otherwise cause defects in the parts being fixed, or potentially cause them to be scrapped.

Furthermore, the invention allows the time required for completing an assembly processes to be reduced, since by using the method of the invention there is no reliance on "back drilling" in order to identify the correct assembly point on the first part.

According to a second aspect, the invention resides in a method of locating an assembly point on a first part, through which the first part is to be joined to a second part, the method comprising the steps of: determining an assembly location in respect of the second part; offering up the first part for assembly with the second part, the first part overlying the determined assembly location; measuring a portion of a surface of the first part spaced away from the second part so as to define the position and orientation of the surface; calculating the assembly point on the surface of the first part, where the surface of the first part is intersected by a vector passing between the determined assembly location and the surface of the first part; and, indicating the calculated the assembly point on the surface of the first part.

The method may further comprise the step of determining a reference position fixed relative to the second part. Optionally, the steps of determining the assembly location and measuring and determining the reference position are performed by a measuring device located in a first position, and the steps of measuring and determining the reference position and step of measuring a portion of a surface of the first part is performed by the or another measuring device in a second position. The steps of measuring from the first and second positions may be performed subsequent to the further step of offering up the first part for assembly with the second part, the first part overlying the determined assembly location.

Preferably, the present invention is implemented using a non-contact technique or device, such as a laser tracker, in order to define the positions of assembly points on the second part. It is also preferable that, the same device such as a laser tracker is used in order to: measure the position and orientation of the first part when overlying the second part; to calculate the position of the assembly points on the surface of the first part; and, to indicate their calculated positions.

Advantageously, this gives rise to the ability to rapidly, and in a single operation, identify and store in a memory associated with the device, such as a laser tracker, the positions of many locations on one of the parts to be assembled. Thus, the speed of the assembly operation may be greatly increased over that of prior art methods. Furthermore, the positions and orientations measured in one step of the method may easily be used in subsequent steps of the method, further increasing the accuracy and speed of operation.

Optionally, at least one measuring step or the step of indicating is performed by a measuring device of known position. Conveniently, the step of determining an assembly location further comprises the step of measuring the vector and the distance to a datum position associated with the second part from a measuring device of known position and determining the position of the assembly location relative to the measured datum position using stored CAD data.

Optionally, the method further comprises the step of verifying that the position and orientation of the surface of the first part relates in a predetermined manner to the position and orientation of the surface of the second part local to the determined assembly location.

The step of determining the assembly location may be carried out using a retro-reflector supported relative to a guide hole located in the second part.

The at least one measuring step or the step of indicating may be carried out using a non-contact technique. Advantageously, the at least one measuring step or the step of indicating may be carried out using a laser tracker device.

Optionally, the method further comprises the step of drilling an assembly hole at the indicated assembly point.

The method may further comprise the step of welding at the indicated point.

The present invention also extends to products manufactured by the process of the present invention, such as multi-component structures, aircraft, wings for aircraft and marine structures such as ship hulls. Furthermore, the present invention also extends to a computer program and a computer program product which are arranged to implement the system of the present invention.

Other aspects and embodiments of the invention, with corresponding objects and advantages, will be apparent from the following description and claims. A specific embodiment of the present invention will now be described by way of example only, with reference to the accompanying drawings, in which:

DETAILED DESCRIPTION OF THE INVENTION

Figure 1:
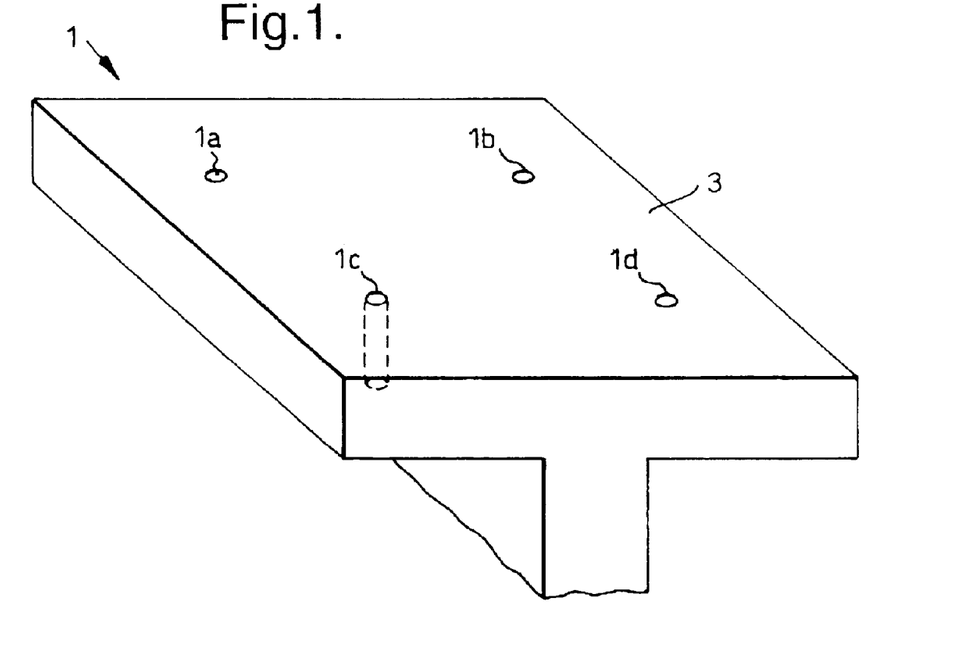
FIG. 1 is a schematic perspective view of a foot of a wing box rib prior to assembly with a wing skin.

Referring to FIG. 1, a single rib foot 1 of a rib of an aircraft wing box is illustrated. The upper surface 3 of the rib foot 1 is planar. As can be seen from the figure, four guide holes 1a, 1b, 1c and 1d have been drilled in the rib foot 1 in the desired locations of the final assembly holes, used for securing the wing skin. The guide holes 1a–1d are drilled using a conventional drilling block (not shown) which is used to ensure that the guide holes are drilled perpendicular to the surface 3 of the rib foot 1. The diameter of the guide holes 1a–1d are drilled to a close tolerance. This ensures that their location may be accurately established prior to offering up the wing skin (not shown), as is described below.

Establishing the positions of the guide holes 1a–1d is achieved in this embodiment using a laser tracker device and retro-reflector, or corner cube, system. The laser tracker may be the Leica LTD500, which is available with suitable retro-reflectors and suitable operating software such as "AXYZ" from Leica Geosystems Ltd., Davy Avenue, Knowlhill, Milton Keynes, MK5 8LB, UK.

As is well known in the art of metrology, a laser tracker device is able to measure a position in three dimensions, measured in terms of azimuth elevation and distance, using a steerable mirror and a laser interferometer distance measurement system.

The position measured by the laser tracker is defined by the location of a retro-reflective target, known as a retro-reflector or corner cube, which reflects light incident on the target by 180°, both in terms of azimuth and elevation, independently of its angle of incidence. As is well known in the art, the retro-reflector is set in a mount having a spherical outer surface. Thus, knowledge of the diameter of the retro-reflector and mount allows the distance between the laser tracker and the centre of the retro-reflector to be correctly calculated.

Figure 2:
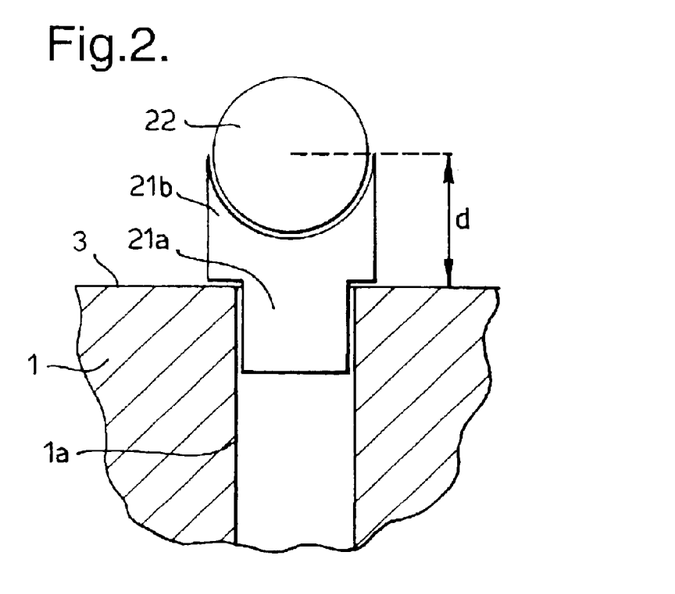
FIG. 2 shows a side view of a retro-reflector supported by an adapter positioned in a pre-drilled guide hole in the rib foot of FIG. 1.
Figure 3:
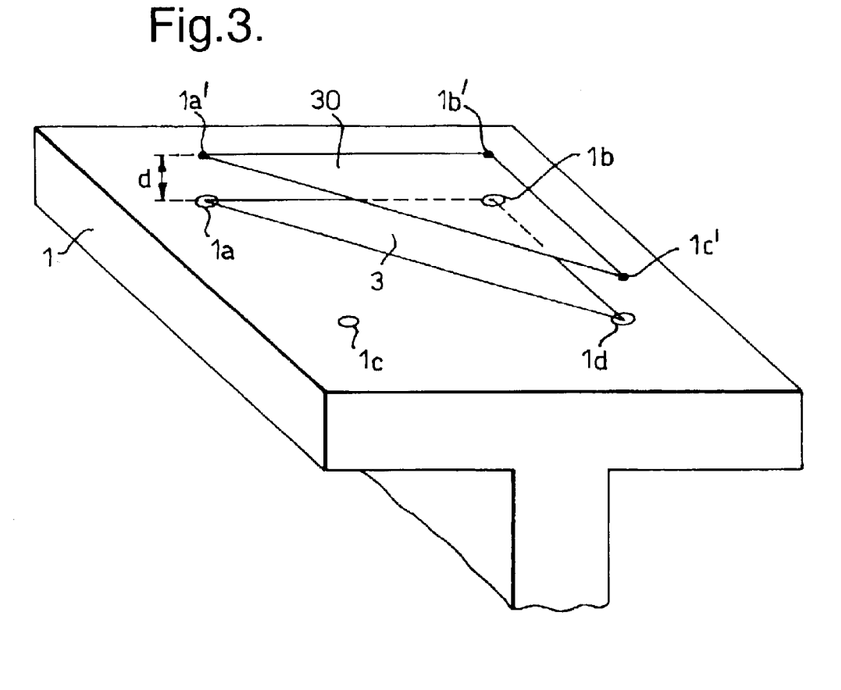
FIG. 3 shows a schematic perspective view of the supporting surface of the rib foot of FIG. 1 with the surface plane of the rib foot defined.

Referring to FIGS. 2 and 3, the method of establishing the positions of each of the guide holes 1a–1d in the present embodiment will now be described.

Prior to measuring the positions of the holes 1a–1d, the wing box is rigidly secured in a suitable jig, such that it is not free to move, or subject to changing ambient conditions. This ensures that the positions and orientations of the guide holes 1a–1d are fixed and stable and will not vary during the implementation of the method of this embodiment.

The laser tracker (not shown) is also set up in a measurement station, ensuring that its position and datum orientation do not vary with respect to the wing box. Additionally, the laser tracker is set up such that it has a direct line of sight to each of the portions of interest of the wing box.

As can be seen from FIG. 2, an adapter 21 is located in hole 1a of the rib foot 1. The adapter 21 consists of a pin 21a and a cup 21b. The pin 21a is accurately machined to be cylindrical in form and be a close fit in the guide hole 1a. Thus, the adapter is arranged to be received by the guide hole 1a to a predetermined depth. The cup 21b of the adapter 21 is accurately formed to hold a retro-reflector 22 of corresponding diameter in a set position relative to the pin 21a.

Thus, when a retro-reflector 22 is positioned in the adapter cup 21b, the centre of the retro-reflector 22 is located a known distance "d" from the surface 3 of the rib foot 1 and is located on the line of the longitudinal axis of the hole 1a, i.e. the retro-reflector 22 is located centrally over the guide hole 1a.

Using the laser tracker (not shown) in tracker mode, the retro-reflector 22 is moved from its calibrated datum position on the laser tracker (known as the bird bath) until it is located in the cup 21b of the adapter 21 as shown in FIG. 2. The position of the retro-reflector 22, as measured by the laser tracker, is then recorded. This may be done either using the point measurement mode on a laser tracker such as the LTD500, or manually.

This point in 3D space is indicated relative to hole 1a in surface 3, in FIG. 3, and is referenced 1a'.

It will be appreciated that the recorded position of 1a' (i.e. that of the centre of the retro-reflector 22) is a known distance normal to the surface 3 of the rib foot 1 (shown in FIG. 1), positioned along the longitudinal axis of the hole 1a. This distance "d" shown in FIGS. 2 and 3 corresponds to the distance between the base of the adapter cup 21b contacting the retro-reflector 22 and the surface 3 plus the radius of the retro-reflector 22.

It will also be appreciated that the position of the point 1a' is measured to three degrees of freedom only. That is to say that it gives no information on the orientation of the hole 1a in the surface 3, relative to the measured point 1a'. However, by repeating the above procedure with two further rib foot holes, in this case holes 1b and 1c, as shown in FIG. 3, two further equivalent points 1b' and 1c' are located. The three points 1a'–1c' define a plane 30 in which each measured point is located, which is parallel to surface 3 of the rib foot 1.

The plane 30 is offset in a known direction from the surface 30 of rib foot 1 by distance "d", as explained above. Thus, the orientations as well as the positions of the holes 1a–1c may be calculated, being located a given distance, "d", from their respective measured points 1a'–1c' in a known direction normal to plane 3.

The position and orientation of the remaining hole 1d may then also be calculated in a similar manner.

It will be appreciated that the plane 30 may alternatively be derived by measuring the positions of four or more holes in the same manner as described above and using a least mean squares algorithm to define the plane 30.

Furthermore, in the event that the surface 3 is non-planar it would also be possible to generate a non-planar surface equivalent to claim 30 by measuring a large number of positions on the surface. A surface could then be fitted to the measured positions using a conventional mathematical method. From such a non-planar surface, positions and orientations of the guide holes 1a–1d may be established as described above.

When the position and orientation of each guide hole required has been established, the wing skin may be offered up and clamped in place relative to the wing box in a conventional manner, for assembly. During the offering up procedure, the combined wing box/wing skin structure should be held fixed and stable.

When the wing skin is clamped in position, the wing skin may be assumed to be locally planar where it overlies each rib foot. However, as the wing profile is curved, the orientation of the outward surface (surface 3 of the rib foot 1) of two given rib feet may not be co-planar. Thus, in order to drill through the wing skin coaxially with a given guide hole behind the wing skin, the orientation of the rib foot, or local wing skin surface must be allowed for. Additionally, the thickness of the wing skin alters the apparent drilling point on the wing skin where the marking out method views the drilling point from a position which is not on the longitudinal axis of the relevant guide hole.

Figure 4:
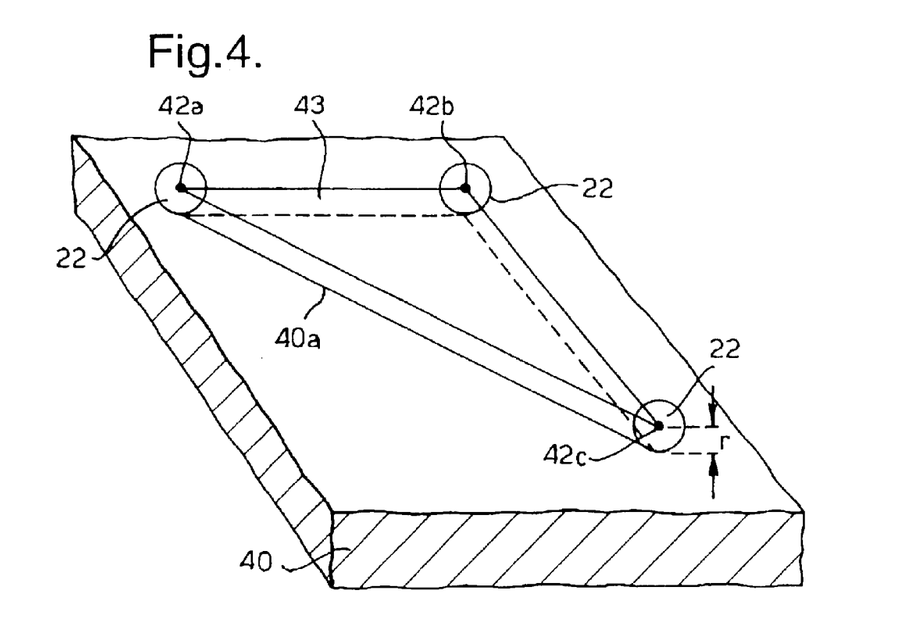
FIG. 4 shows a fragmentary view of the outer surface of a wing skin, offered up in position for fixing to the rib foot of FIG. 1 prior to being drilled.
Figure 5:
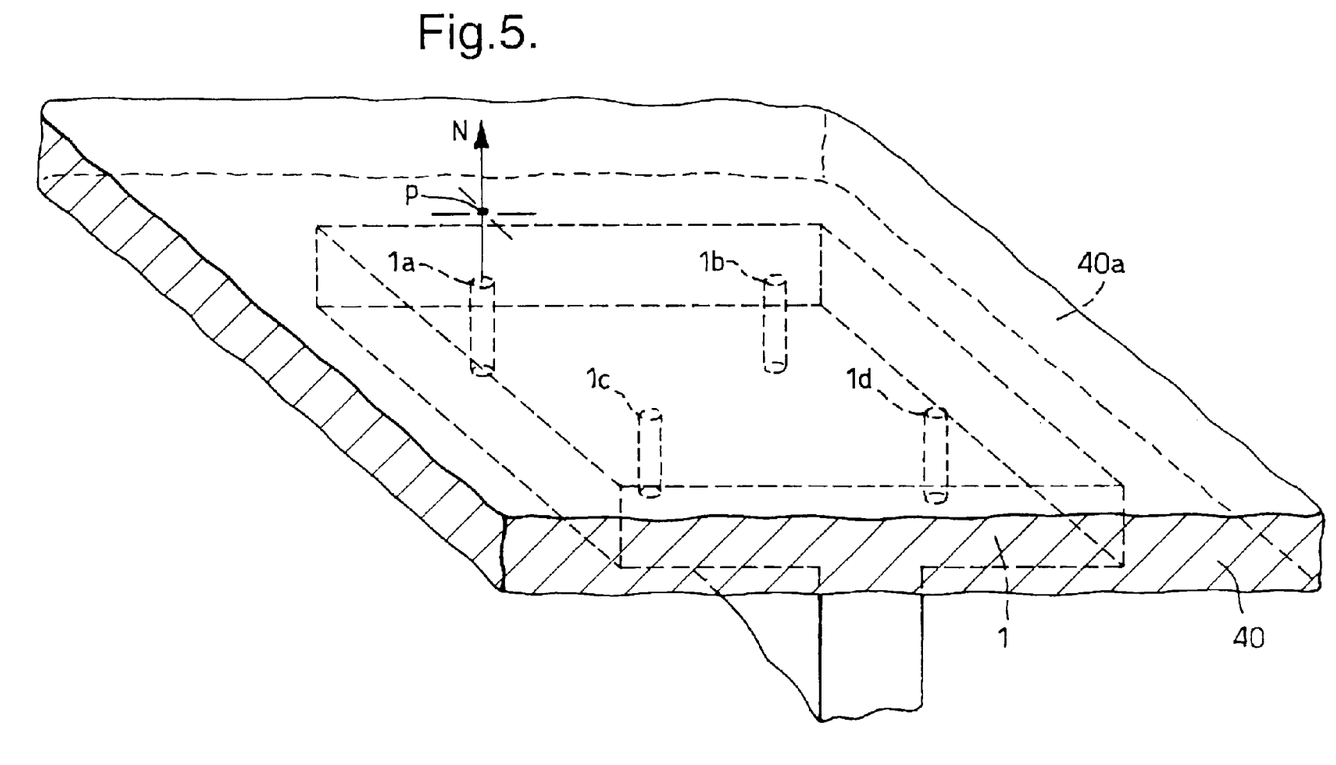
FIG. 5 shows a schematic perspective view of FIG. 4, where the underlying rib foot is also shown, with a drill point on the wing skin being indicated.

Referring to FIGS. 4 and 5, the process of locating drilling locations on the outside of the wing skin which allows for drilling coaxially with the guide holes 1a–1d, taking into account the thickness and orientation of the wing skin surface will now be described.

FIG. 4 shows schematically a fragmentary perspective view of the upper surface 40a of a wing skin 40, offered up to the wing box and overlying rib foot 1 (not shown), prior to drilling the assembly holes.

In the same manner as previously described for finding the positions and orientations of holes 1a–1d, the equation of the plane defined by the outer surface 40a of the wing skin 40 locally overlying the rib foot 1 is determined. That is to say, using the laser tracker in tracker mode, the retro-reflector 22 is moved from it calibrated datum position to a position contacting the surface 40a of the wing skin 40 overlying the rib foot 1, where a point measurement is taken, as previously-described. This point is referenced 42a in FIG. 4. To this end, as the laser tracker has stored the position of the holes 1a–1d in the rib foot 1, it can be used to indicate a first approximate position of the outer surface 40a of the wing skin 40 that overlies the rib foot 1.

Two or further point measurements, referenced 42b and 42c, are taken on the same region to define three or more non-collinear points defining a plane 43 offset from the wing skin surface 40a, as shown in FIG. 4.

The local planar surface of the wing skin 40 lies parallel to, and is offset from, the plane 43 in a known direction by the radius "r" of the retro-reflector 22.

Thus, the equation of the plane 43, defining the outside surface 40a of the wing skin 40, can be defined using standard geometrical techniques.

The equation of the plane 43 is then compared to the equation defining the plane 3 of the supporting surface of the rib foot 1. If the wing skin has been correctly offered up for fixing, the two planes should be parallel, offset by the thickness of the wing skin. If this is not the case (i.e. "gapping" has occurred between the rib foot 1 and the wing skin) and the discrepancy lies outside the acceptable tolerance, the process of offering up may be repeated.

Having defined the equation to the plane 43, and verified that the process of offering up has been correctly carried out, the drilling points to be marked in the upper surface 40a of the wing skin 40 are calculated. This is done in the following manner.

Referring to FIG. 5, a schematic perspective view of the wing skin 40 of FIG. 4 is illustrated, together with the supporting rib foot 1. For each guide hole 1a–1d, a vector is calculated, using standard geometric techniques, which passes through the centre of the guide hole along its longitudinal axis, and is normal to the local surface of the wing skin; i.e. plane 43, as is shown in FIG. 4. This vector, for hole 1a is illustrated by arrow "N" in FIG. 5.

Where the vector "N" intersects the plane 43, a drilling point is defined on the wing skin surface 40a. Again standard geometric techniques are used to calculate the intersection of the plane 43 by the vector "N". This point is referenced "P" in FIG. 5. Additionally, vectors (not shown) are computed from the laser tracker location, passing through each drilling point "P".

The laser tracker is then used to orientate the laser along each of these calculated vectors in turn, so that the laser falls on the projected location "P" for each drilling point which has been calculated.

An operator may then mark with a pencil cross, or using another suitable marking method, the drilling points, as indicated by the projected laser spot.

Finally, a drilling operation is undertaken to drill at an angle normal to the local wing skin surface, through the wing skin at each marked drilling point. This is achieved using a conventional drilling block as previously described.

When the wing skins have been assembled with the wing box, using the method of the present embodiment, to form a completed wing assembly, two such wing assemblies may be mounted on an aircraft fuselage, to form an aircraft in the conventional manner.

It will be appreciated that in the present embodiment, instead of establishing the equation of the plane of the outer surface of the wing skin locally overlying each rib foot using a point measurement mode, it is possible to use the laser tracker in continuous mode (where many position measurements are made every second), tracking a retro-reflector which is held continuously in contact with the outer surface of the wing skin and "zig-zagged" across the surface. Thus, it is possible to obtain rapidly enough measurements to determine the position and orientation of any part of a large portion of the outer surface of the wing skin in one operation. Then, as previously described, vectors may be calculated from the centre points of each guide hole, normal to the local surface of the wing skin.

It will also be appreciated that it is not necessary to calculate the orientation as well as the position of points 1a–1d in order to implement the invention, since a point known to three degrees of freedom is sufficient in order to determine the vector "N" which passes through that point and intersects the wing skin at an angle normal to the local wing skin surface. However, by calculating the orientation as well as the position of the points 1a–1d, a check that the surface 3 of rib foot 1 and the surface 40a of the wing skin are co-planar may be made, as described above. Thus, it is possible, using the method of the present embodiment, to verify that the wing skin has been correctly offered up to the wing box prior to assembly.

Figure 6:
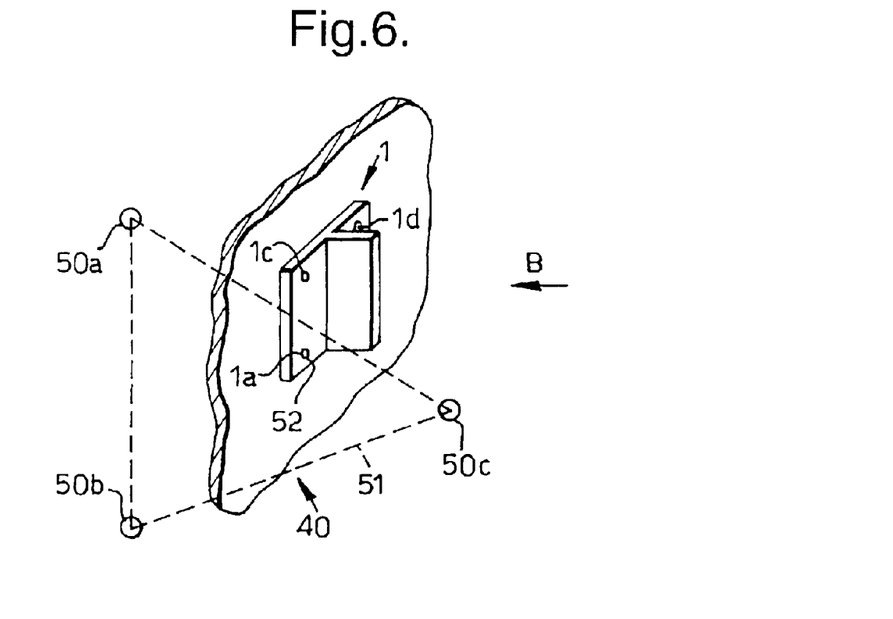
FIG. 6 shows a schematic perspective view of a rib foot in place against a wing skin prior to being attached to the wing skin from a position behind the wing skin.
Figure 7:
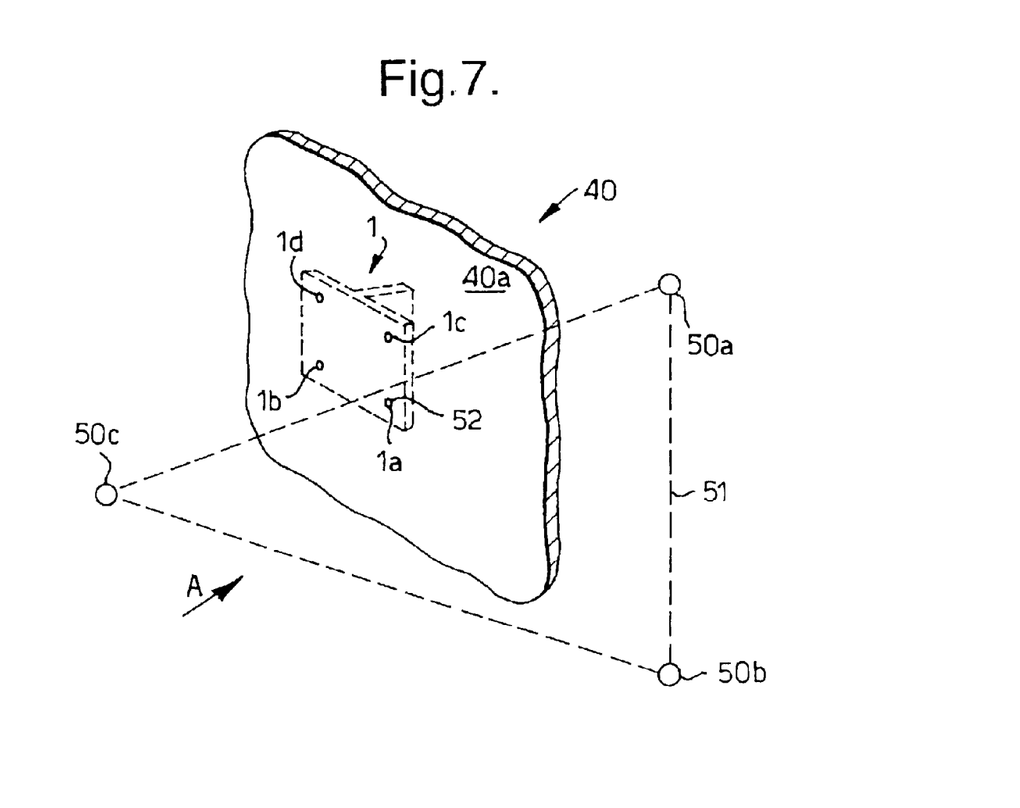
FIG. 7 shows a schematic perspective view of FIG. 6, but from a position in front of the wing skin, the position of the now-hidden rib foot also being indicated.

Alternatively, the present invention may be used according to a second embodiment to mark out positions on a wing skin 40 corresponding to the underlying holes 1a–1d in a rib foot 1 where the wing skin 40 has previously been offered up to the rib foot 1. Referring to FIGS. 6 and 7, the laser tracker is positioned to the rear of the rib foot 1 in a first location. At this point, the wing skin 40 has already been offered up to the rib foot 1 and so is in situ. The adapter 21 and retro-reflector 22 are subsequently moved between three reference positions 50a–50c that are visible both from in front of the rib foot 1 in the direction marked "A" and behind the rib foot 1 in the direction marked "B". The three reference positions 50a–50c are measured by the laser tracker in the same manner as previously described for the first embodiment and used to define a reference frame 51 as follows.

The first reference position 50a is taken to be the origin of a reference coordinate system defining the reference frame 51. The vector between the first reference position 50a and the second reference position 50b ($v_{ab}$) is calculated and taken as the x-axis of the reference coordinate system. The third reference position 50c will lie somewhere on the xy-plane of the reference coordinate system, so the vector between the first reference position 50a and the third reference position 50c is calculated ($v_{ac}$) and the cross product of $v_{ab}$ and $v_{ac}$ calculated. By definition, the cross product must give a vector defining the z-axis of the reference coordinate system. Finally, the y-axis is calculated by taking the cross product of the z-axis and x-axis.

The coefficients of the x-, y- and z-axes are then normalised to produce unity vectors and a first 4×4 matrix is formed that comprises the unity vectors of the x-, y- and z-axes in the first three rows of the first three columns, the fourth column comprising the coordinates of the first reference position 50a (the origin). The first three columns of the fourth row are set to zero and the fourth column of the fourth row is set to unity. This first 4×4 matrix can now be used to convert any position measured by the laser tracker from its first position into a position within the reference coordinate system.

With the first 4×4 matrix defined, the adapter 21 and retro-reflector 22 are then placed in one or more of the holes 1a–1d in the rib foot 1 and their positions 52 measured by the laser tracker. As before, the position 52 measured by the laser tracker is the position of the centre of the retro-reflector, and this position is a distance "d"-from the back surface of the rib foot on the desired hole axis. If required, the first 4×4 matrix relating the first laser tracker position to the reference coordinate system could be used to define the measured hole positions 1a–1d with respect to the reference coordinate system.

The laser tracker is then moved to the front of the rib foot 1 to a second position. From this second laser tracker position, the rib foot 1 is hidden behind the wing skin 40. The adapter 21 and retro-reflector 22 are moved between the same three reference positions 50a–50c which still define the same reference frame 51, and their positions measured by the laser tracker in the same way. The same process described above is performed to define the reference coordinate system, and a second 4×4 matrix formed as described above. In this case, the second 4×4 matrix relates the positions measured by the laser tracker in the second position to the reference coordinate system rather than relating the positions measured by the laser tracker in the first position to the reference coordinate system, a function the first 4×4 matrix performs.

The positions of the holes 1a–1d of the rib foot 1 that the laser tracker measured from its first position behind the rib foot 1 and wing skin 40 can now be calculated relative to its new second position in front of the rib foot 1 and wing skin 40. This is achieved by forming a third 4×4 matrix relating the hole positions measured in the first laser tracker position to hole positions relative to the second laser tracker position: this third 4×4 matrix is formed by multiplying the second 4×4 matrix with the inverse of the first 4×4 matrix. The positions of the holes measured in the first laser tracker position are then pre-multiplied by the third 4×4 matrix (by forming a four element matrix containing the x-, y- and z-positions of the measured positions, with the fourth element set to unity) to obtain the positions of the holes relative the second laser tracker position.

The required positions on the outer surface 40a of the wing skin 40 corresponding to each measured hole 1a–1d are indicated in turn as follows. It should be remembered that these points are geometrically connected to the measured hole position by a line that extends perpendicular to the outer surface 40a of the wing skin 40.

The retro-reflector 22 is moved from the laser tracker bird bath and placed in contact with the outer surface 40a of the wing skin 40 and rubbed over the outer surface 40a. The laser tracker continuously tracks the retro-reflector 22 and software continuously calculates the distance from the retro-reflector position to the hole position and displays this distance on a display. The retro-reflector 22 is manually rubbed across the surface so that this distance is minimised. The minimised position is then set as the origin for a local coordinate system that will reflect the local skin curvature. As the minimum distance has been found, this origin will be on a perpendicular line from the outer surface 40a of the wing skin 40 that passes approximately through the hole position (i.e. the centre of the hole 1a–1d at the rear plane of the rib foot 1). However, the origin may still fall outside of an acceptable tolerance for accuracy the local curvature of the outer surface 40a of the wing skin 40 is relatively small.

An improved position is found by using local coordinate system. This is defined by moving the retro-reflector 22 a short distance (say 10 mm) in a direction corresponding to the desired x-axis of the local coordinate system. The position is measured, a vector from the origin calculated and this then defines the x-axis. An approximate y-axis defining the xy-plane and not the true orthogonal y-axis is defined in the same way. The x-axis and approximate y-axis need not be orthogonal. The local coordinate system is then calculated using the local origin and the local x-axis and approximate y-axis in the same way that the reference coordinate system was calculated earlier. This local coordinate system embodies the local curvature of the outer surface 40*a* of the wing skin 40 by definition. In a manner analogous to those described above, positions known relative to the laser tracker's second position can be transformed into the local coordinate system.

The required position on the outer surface 40*a* of the wing skin 40 is found by placing the retro-reflector 22 against the outer surface 40*a* once more and rubbing the retro-reflector 22 over the outer surface 40*a*. The laser tracker, which remains in its second position, takes a measurement of the position of the retro-reflector 22 every 50 ms and, for each new reading, resets the origin of the local coordinate system to the new position and recalculates the local coordinate system transformation accordingly. This is done simply by translating the old origin to the new origin position. It is assumed that the curvature of the outer surface 40*a* of the wing skin 40 remains flat over the local area, thereby obviating the need for any rotation of the local coordinate frame axes with the translation.

The hole position previously measure at the first laser tracker position is then transformed into the local coordinate system: if the retro-reflector 22 is at the correct position, the transformed hole position will have zero x and y coordinates, being displaced only in the perpendicular z direction. Otherwise, the x and y coordinates indicate the distance in x and y that the retro-reflector 22 is away from the desired point. This distance information can either be displayed so that the retro-reflector 22 can be manually moved to the desired point or, if the retro-reflector 22 is being held in a motorised table, can be used to drive the retro-reflector 22 to the desired point. The desired point may then marked on the outer surface 40*a* of the wing skin 40. Alternatively, an operation such as drilling may be performed straight away at that location. For example, where the retro-reflector 22 is being held in a motorised table, the retro-reflector 22 may be removed and a drill bit used to drill at that location using a drill block. The drill will thus enter the outer surface 40*a* of the wing skin 40 perpendicularly and at a point that ensures it will emerge from the rear of the rib foot 1 through the exact centre of the corresponding hole 1*a*–1*d*.

It will be understood that the calculations described above in relation to the second embodiment of the invention could equally well be used in the first embodiment of the invention.

It will be clear from the foregoing that the above described embodiments are merely examples of how the invention may be put into effect. Many other alternatives will be apparent to the skilled person which are within the scope of the present invention.

For example, although the above embodiments have been described with reference to a method of marking out the locations for drilling, it will be appreciated that it may also be used in conjunction with various other assembly methods, such as welding.

Furthermore, although in the above embodiments guide holes were drilled in order to obtain position information as to where the assembly holes subsequently drilled through the wing skin should be located, other methods of achieving this function may instead be employed. For example, instead of using an adapter to locate a retro-reflector at a known offset from a guide hole, "land finders" or jigs, supporting a retro-reflector in a position with a known correspondence to a desired drilling location could be temporarily held in a predetermined position in relation to the rib feet. In this manner, the guide hole drilling operation may be dispensed with, thus obviating the possibility of causing "pipped" holes and reducing the time taken to complete the assembly operation.

Additionally, an operator may take measurements with the laser tracker of a reference coordinate system prior to the assembly operation. This allows the operator the possibility of repeating the measurement of the reference coordinate system during the assembly operation in order to verify that neither the tracker, nor the assembly has moved from their initial positions. Furthermore, by doing this, a single tracker may be moved between several measurement stations and subsequently brought back to an earlier measurement station in order to cover a large assembly process. In such a process, the difference in location between measurement stations of the laser tracker may be detected using known datum positions and thus compensated for. This may be required in the assembly operation of a large structure, for example an aircraft or ship.

The skilled reader will realise that the present invention may also be implemented using CAD data for the parts to be assembled. In such an embodiment, for a non-compliant structure it is only necessary to measure selected datum locations relative to a first part prior to the offering up the second or further parts for fixing. The CAD data may then be used to determine the assembly locations on the first part, relative to the located datum points, without requiring each assembly point to be individually measured. Furthermore, by measuring further datum locations relating to the part or parts offered up to the first part for fixing, CAD data may be used in order to define the surface position and orientation of the parts offered up. Thus, by using CAD data, the number of measurement which are required to be made may be greatly reduced, thus reducing the time required to carry out the process.

The skilled reader will also appreciate that the present invention may also be put into effect using metrology equipment other than a laser tracker. For example, in a given application, if the distances being measured and the accuracy required permits, a laser striper may instead be used, or indeed any measurement technique using a programmable laser pointer, or equivalent device. Such an implementation of the present invention may provide a cost and time efficient method of marking out assembly locations in industries where typically the component sizes, and hence measurement distances, are reduced. For example, the automobile industry.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of locating an assembly point on a first part, at which assembly point the first part is to be joined to a second part, the method comprising the steps of:

measuring and determining an assembly location coincident with the second part;

measuring a portion of a surface of the first part, the surface being spaced away from the second part, so as to define the position and orientation of the surface;

calculating as the assembly point on the surface of the first part a point at which the surface of the first part is intersected perpendicularly by a vector passing through the determined assembly location; and indicating the calculated assembly point on the surface of the first part.

2. A method according to claim 1, further comprising the step of verifying that the position and orientation of the surface of the first part relates in a predetermined manner to the position and orientation of the surface of the second part local to the determined assembly location.

3. A method according to claim 1, wherein the step of determining the assembly location is carried out using a retro-reflector supported relative to a guide hole located in the second part.

4. A computer program comprising program code means for performing the method steps of measuring, calculating and indicating as defined in claim 1 when the program is run on a computer and/or other processing means associated with suitable measuring and indicating means.

5. A computer program product comprising program code means stored on a computer readable medium for performing the method steps of measuring, calculating and indicating as defined in claim 1 when the program is run on a computer and/or other processing means associated with suitable measuring and indicating means.

6. A method according to claim 1, wherein at least one measuring step or the step of indicating is performed by a measuring device of known position.

7. A method according to claim 6, wherein the step of determining an assembly location further comprises the step of measuring the vector and the distance to a datum position associated with the second part from a measuring device of known position and determining the position of the assembly location relative to the measured datum position using stored CAD data.

8. A method according to claim 1, wherein at least one measuring step or the step of indicating is carried out using a non-contact technique.

9. A method according to claim 8, wherein at least one measuring step or the step of indicating is carried out using a laser tracker device.

10. A method according to claim 1, further comprising the step of determining a reference position fixed relative to the second part.

11. A method according to claim 10, wherein the steps of determining the assembly location and measuring and determining the reference position are performed by a measuring device located in a first position, and the steps of measuring and determining the reference position and step of measuring a portion of a surface of the first part is performed by the or another measuring device in a second position.

12. A method according to claim 11, wherein the steps of measuring from the first and second positions are performed subsequent to the further step of offering up the first part for assembly with the second part, the first part overlying the determined assembly location.

13. A method of locating an assembly point on a first part, through which the first part is to be joined to a second part, the method comprising the steps of:

determining an assembly location coincident with the second part;

offering up the first part for assembly with the second part, the first part overlying the determined assembly location;

measuring a portion of a surface of the first part spaced away from the second part so as to define position and orientation of the surface;

calculating the assembly point on the surface of the first part a point at which the surface of the first part is intersected perpendicularly by a vector passing through the determined assembly location; and indicating the calculated assembly point on the surface of the first part.

* * * * *